US 6,549,133 B2

(12) United States Patent
Duncan et al.

(10) Patent No.: US 6,549,133 B2
(45) Date of Patent: Apr. 15, 2003

(54) REMOTE TRANSMITTER AND METHOD

(75) Inventors: Timothy T Duncan, Tucson, AZ (US); Timothy J. Crist, Tucson, AZ (US); Kent D. Christensen, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 195 days.

(21) Appl. No.: 09/765,718

(22) Filed: Jan. 18, 2001

(65) Prior Publication Data
US 2002/0092478 A1 Jul. 18, 2002

(51) Int. Cl.$^7$ ............................................. G08B 23/00
(52) U.S. Cl. .................... 340/573.3; 119/720; 119/719; 119/859; 119/908; 340/539; 340/573.3
(58) Field of Search ................................ 119/720, 719, 119/859, 908; 340/539, 573.3

(56) References Cited

U.S. PATENT DOCUMENTS

| | | | | |
|---|---|---|---|---|
| 4,802,482 A | * | 2/1989 | Gonda et al. | 119/720 |
| 5,054,428 A | * | 10/1991 | Farkas | 119/720 |
| 5,193,484 A | * | 3/1993 | Gonda | 119/859 |
| 5,471,954 A | * | 12/1995 | Gonda et al. | 119/859 |
| 5,559,498 A | * | 9/1996 | Westrick et al. | 340/573.1 |
| 5,666,908 A | | 9/1997 | So | 119/720 |
| 5,769,032 A | | 6/1998 | Yarnall, Sr. et al. | 119/721 |
| 5,857,433 A | * | 1/1999 | Files | 119/720 |
| 5,911,199 A | * | 6/1999 | Farkas et al. | 119/859 |
| 6,003,474 A | * | 12/1999 | Slater et al. | 119/859 |
| 6,052,097 A | | 4/2000 | Duncan et al. | 343/788 |
| 6,064,308 A | | 5/2000 | Janning et al. | 340/573.3 |
| 6,170,439 B1 | * | 1/2001 | Duncan et al. | 119/720 |
| 6,184,790 B1 | * | 2/2001 | Gerig | 340/573.3 |

OTHER PUBLICATIONS

"Superdog Electronic Dog Trainer Series", EDT100, EDT102, EDT200; EDT202, EDT300 and EDT302, D. T. Systems, Inc., Dallas, Texas, 5 pages.
"dogtra 250 Digital System", Dog Training Systems, SOS Co., Inc., Fountain Valley, California, 2 pages.
"Introducing a New Breed of Tri–Tronics Electronic Dog Training Equipment", Transmitter Holster, Tri–Tronics, Tucson, Arizona, 2 pages.

* cited by examiner

Primary Examiner—Daryl Pope
(74) Attorney, Agent, or Firm—Cahill, von Hellens & Glazer P.L.C.

(57) ABSTRACT

A portable dog-training transmitter unit for controlling remote collar-mounted receiver/stimulus units includes first, second, and third switches for causing corresponding transmitted stimulus control signals to be recognized by corresponding first, second, or third receiver/stimulus units. A multiple-position switch sets the use of transmitted codes that control the amplitudes of stimulus signals produced by the recognizing receiver/stimulus unit. The transmitter unit is supported in a holster that is pivotally supported by a belt clip through the use of a pivot pin that is pivotally retained in a receiving slot of the belt clip. The transmitter unit includes a controller which polls the states of the various switches to produce a digital signal that is shaped by a buffer circuit, FM modulated, preamplified, and coupled by a simplified matching network to the input of a power amplifier. A single pi matching network is coupled to match an output of the power amplifier to an antenna of the transmitter unit.

32 Claims, 5 Drawing Sheets

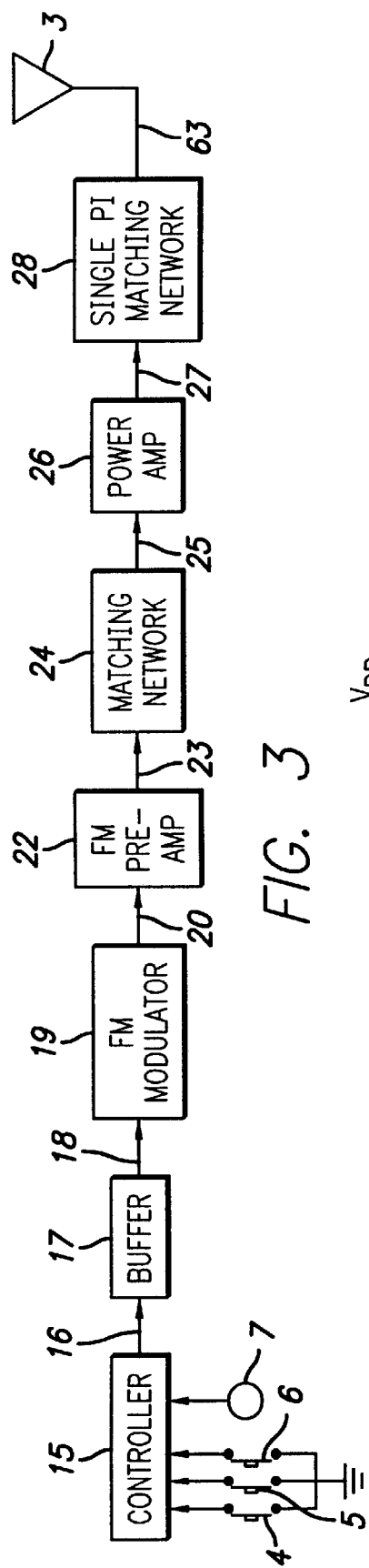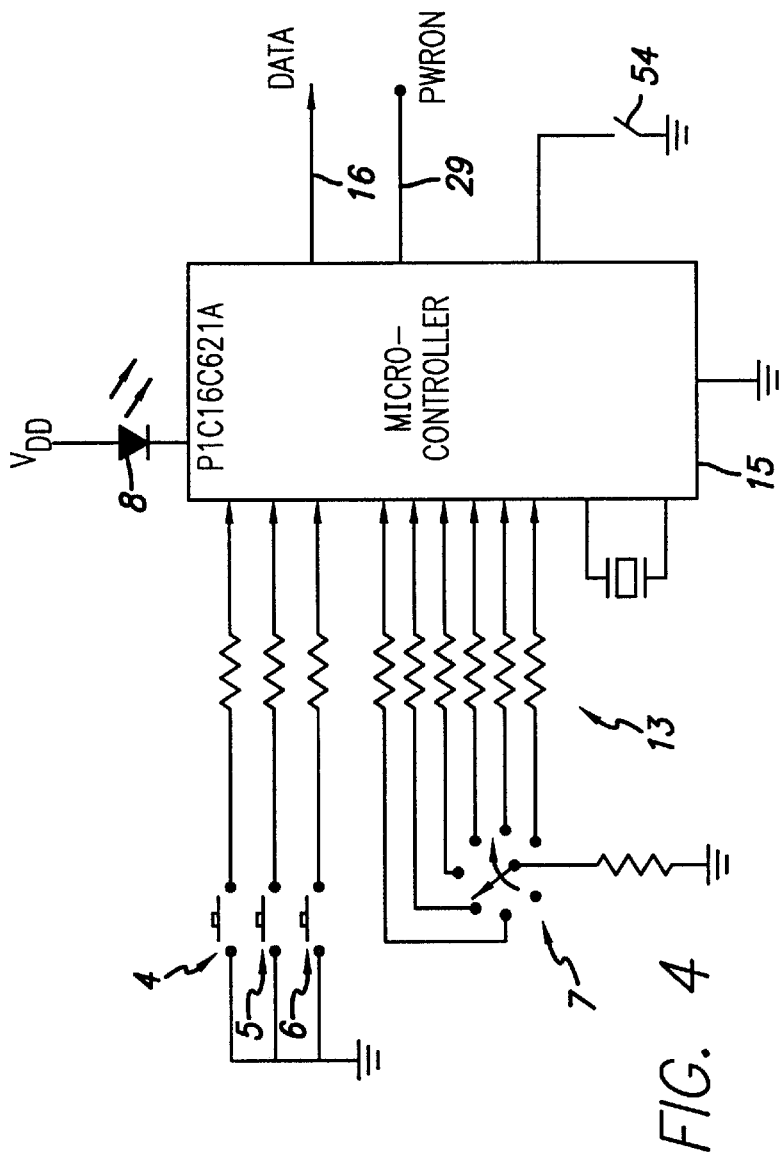

REMOTE TRANSMITTER AND METHOD

BACKGROUND OF THE INVENTION

The invention relates to small, portable transmitters used for dog training by transmitting stimulation control signals to collar-mounted receivers on one or more dogs being trained, and more particularly to a system that (1) provides remote control of the amplitude of stimulus pulses applied to electrodes which are maintained in contact with the skin of the dog (s), and (2) also provides remote control of the amplitude of open circuit output voltages applied between stimulus electrodes (i.e., when the electrodes are not in electrical contact with the skin of the dog (s)).

A basic requirement of a remote training device of the general type including stimulus intensity that is controllable by a remote transmitter is that each remotely selected intensity level must reliably and consistently apply the same electrical stimulus level to the animal being trained. If this requirement is not met, inconsistent stimulus levels received by the animal often causes confusion to the animal, which interferes with the training process.

A shortcoming of some prior remote training systems having remotely selectable control of the amplitude of the stimulus signal between the skin-contacting electrodes is that for the lower values of the intensity settings, neither the open circuit nor the "loaded" electrode voltages applied between the contacting electrodes are high enough to cause effective electrical contact of the electrodes with the animals' skin. The animal does not feel and therefore does not respond to the intended stimulus for lower selected intensity control settings. (A trainer observing the lack of response then is likely to increase the selected stimulus level on the remote transmitter until the animal responds. At that point, the stimulus level actually felt by the animal may suddenly be much higher than is justified by its behavior and may be far too great, causing confusion or fright of the animal which, of course, is counterproductive.) The foregoing problems may be caused by a combination of the dryness of the animals' skin, the tightness of the collar pressing the electrodes against the animals' skin, and various other conditions that cause or contribute to ineffective electrical contact of the electrodes with the animals' skin. The only known reliable way of nevertheless ensuring electrical contact of the electrodes to the animals' skin is to ensure that the open circuit output voltage produced by the secondary winding of the output transformer in the receiver is high enough to arc across any gap or insulative barrier between the electrodes and the animals' skin.

Commonly assigned U.S. Pat. No. 4,802,482, by Gerald J. Gonda and Gregory J. Farkas, issued Feb. 7, 1989, and incorporated herein by reference, and commonly assigned U.S. Pat. No. 5,054,428, by Gregory J. Farkas, issued Oct. 8, 1991, also incorporated herein by reference, disclose prior remote animal training systems in which intensity of electrical stimulus is remotely controlled by causing the receiver circuits to produce various stimulus waveforms of constant amplitude and selectable duration and/or frequency. The high open circuit stimulus voltage needed is achieved independently of the intensity level selected. The devices disclosed in these patents provide reliable electrical contact of the electrodes to the skin of the animal being trained by providing sufficiently high open circuit voltages to ensure that even low levels of stimulation produced by controlling the output pulse widths and repetition rates are reliably felt by the animal.

Because of the lack of a wide range of nearly immediately selectable stimulus levels in the prior art remote training devices, professional trainers have had to plan particular training sessions so as to include only activities and circumstances likely to cause dog behaviors which would require stimulus levels within the range determined by the pluggable intensity-level-setting resistors and/or the resistive electrodes on the collar mounted receiver unit. Then, if unexpected behavior or unexpected circumstances occurred during the training session, the trainer often was not able to immediately select a high, effective stimulus level. In such a case, an opportunity for effective training was lost, and the training process may have been set back as a result of inconsistent and/or inappropriate stimulus. That problem is solved by the system disclosed in commonly assigned U.S. Pat. No. 6,170,439, entitled "REMOTE CONTROLLED ANIMAL TRAINING SYSTEM", by Duncan et al., Ser. No. 09/339,491, issued Jan. 9, 2001, incorporated herein by reference. That patent discloses that even though the circuitry disclosed in the foregoing patents is capable of providing the stimulus voltage with a very wide range of selectable pulse widths and pulse frequencies, the physiology of the dogs being trained is such that the effective range of remotely selectable stimulus that can be achieved by adjusting only the pulse widths and repetition rates of the electrode pulses is much less than is desirable for a wide range of training conditions. The foregoing commonly assigned patent discloses a system which provides remotely controlled stimulus levels that can be promptly changed to any desired level within a very broad range so that a trainer can immediately provide stimulus levels appropriate to any dog behavior likely to occur in any environmental circumstance likely to occur during any training session.

One of the assignees prior products, Tritronics model A270, allows a trainer to transmit separate stimulus signal/commands from a single handheld transmitter unit to separate remote collar-mounted receiver units on separate dogs. The transmitter unit includes separate pushbutton switches, which, when depressed, cause the transmitter unit to transmit separate stimulus/commands signals to the separate collar-mounted receiver units, respectively.

Dog trainers frequently have the dog on a leash or check cord, or use a "heeling" stick, any of the which requires the use of one hand. However, the trainer often needs to use one hand or even two hands to provide hand signal training of the dog during the training session. During hunting sessions, a dog owner or trainer is likely to carry a gun, two-way radio, binoculars or spotting telescopes and/or the like. It would be very advantageous to a dog trainer and/or a hunter working with a hunting dog to have a remote dog-training transmitter which is easily operable with minimal use of only one hand.

There is an unmet need for a dog training system which reliably solves the above described problems, and nevertheless is much smaller and less costly than the system disclosed in U.S. Pat. No. 6,170,439.

SUMMARY OF THE INVENTION

Accordingly, it is an object of the invention to provide an improved, small, low-cost, low-power transmitter unit which is adaptable to transmit multiple stimulus control signals to a single collar-mounted receiver unit of a single dog, or alternatively, to transmit separate, independent of stimulus control signals to multiple collar-mounted receivers mounted, respectively, on separate dogs.

It is another object of the invention to provide an improved, low-power transmitter unit which is adaptable to transmit multiple level stimulus control signals to a single collar-mounted receiver unit of a single dog, or alternatively, to transmit separate, independent continuous stimulus control signals to multiple collar-mounted receivers mounted, respectively, on different dogs, and which is smaller and less costly than the system disclosed in U.S. Pat. No. 6,170,439.

It is another object of the invention to provide a small, low-cost, low-power transmitter unit which can be easily deployed to send stimulus control signals to a collar-mounted receiver unit mounted on a dog without the need for the trainer to remove the transmitter from its holster or to remove the holster from a belt clip supporting the holster.

It is another object of the invention to provide a small, low-cost, low-power transmitter unit which can be easily deployed by a dog trainer to send stimulus control signals to a collar-mounted receiver unit on a dog, with minimal need for the trainer to use either hand to operate the transmitter unit to transmit a stimulus control signals to the collar-mounted receiver unit.

Briefly described, and in accordance with one embodiment thereof, the invention provides a portable dog-training transmitter unit (1) for transmitting stimulus control signals to a remote collar-mounted receiver/stimulus unit (10) on a dog. The transmitter unit a rectangular housing (2) having opposed the front and rear surfaces, opposed right side and left side surfaces, and opposed top and bottom surfaces and an antenna (3) extending upward from the top surface. A control panel area (2A) is provided on the upper right portion of the front surface, and first (4), second (5), and third (6) pushbutton switches are disposed in the control panel area (2A) to control first, second, and third functions, respectively, represented by stimulus control signals transmitted by the transmitter unit (1). A multiple-position thumbwheel detent switch (7) is disposed in an upper right corner portion of the control panel area (2A) for setting the amplitudes of stimulus signals produced by the collar-mounted receiver/stimulus unit. The first (4), second (5), and third (6) pushbutton switches and the thumbwheel detent switch (7) have surfaces which are approximately flush with the surface of the control panel area (2A). The thumbwheel detent switch (7) is disposed in a recess (7A) in an upper right portion of the control panel area (2D). Transmitter circuitry in the housing includes a controller (15) having a plurality of inputs coupled to the first (4), second (5), and third (6) pushbutton switches and the thumbwheel detent switch (7) the controller including a first output (16) conducting digital data representative of the states of the first, second, and third pushbutton switches in the thumbwheel detent switch. A buffer circuit (17) Includes an input coupled to the first output (16) of the controller for shaping pulses constituting the digital data. In FM modulator (19) Has an input coupled to an output (18) of the buffer, for performing the function of modulating the 27.045 MHZ carrier with the desired digital data. An FM preamplifier (22) has an input coupled to an output (20) of the FM modulator, for performing the function of buffering the oscillator and amplifying the signal for use in the output stage. A matching network (24) has an input coupled to an output (23) of the FM preamplifier. A power amplifier (26) has an input coupled to an output (25) of the matching network. A single pi matching network (28) has been an input coupled to an output (27) of the power amplifier and an output (63) coupled to the antenna (3). The controller (15) includes a switch polling program, and executes the switch polling program in response to depressing of any pushbutton switch for setting of a thumbwheel switch to determine the states of the first, second, and third pushbutton switches and the thumbwheel detent switch. The controller (15) can be configured to cause the first (4) and second (5) pushbutton switches, when depressed, to produce different corresponding stimulus intensity levels to be produced by the collar-mounted receiver stimulus unit (10), wherein the first pushbutton switch (4), when depressed, causes a continuous a stimulus intensity level of amplitude determined by the setting of the thumbwheel detent switch (7) to be produced by the collar-mounted receiver/stimulus unit (10) for as long as the first pushbutton switch (4) remains depressed, up to a predetermined maximum duration, and the second pushbutton switch (4), when depressed, causes a predetermined stimulus intensity level of a predetermined duration to be produced by the collar-mounted receiver/stimulus unit (10). Alternatively, the controller (15) can be configured to cause the transmitter unit (1) to transmit different first, second, and third address codes recognizable by first, second, and third remote collar-mounted receiver/stimulus units, respectively, in response to depressing of the first (4), second (5), and third (6) pushbutton switches, respectively. In one embodiment, the housing (2) is removably supported, a pivot pin (67) rigidly attached to a rear surface of the holster, and a belt clip 68 in which the pivot pin (67) is pivotally retained.

BRIEF DESCRIPTION OF THE DRAWINGS

FIG. 3 is a block diagram of the circuitry included in the transmitter unit of FIG. 1.

FIG. 4 is a diagram illustrating microcontroller 15 and user input circuitry 13 of FIG. 3.

DETAILED DESCRIPTION OF THE PREFERRED EMBODIMENTS

Figure 1:
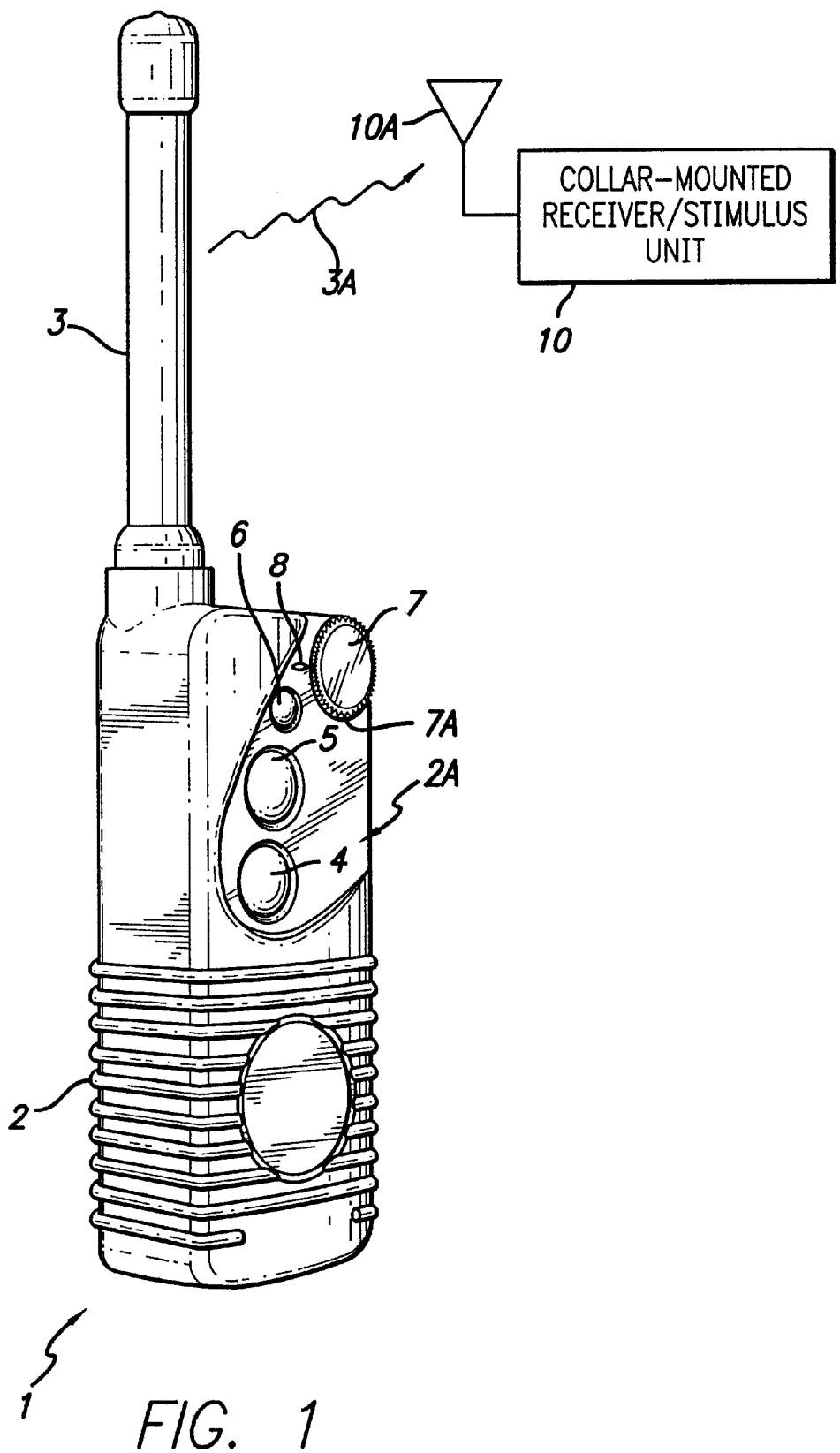
FIG. 1 is a perspective view of the portable transmitter unit of the present invention.

Referring to FIG. 1, transmitter 1 includes a housing 2 and an antenna 3 attached to the top of housing 2. Housing 1 includes a "control panel" area 2A on its front face including button switches 4, 5, and 6. A seven-position rotary detent thumbwheel switch 7 is positioned in a recess 7A a in the upper right corner of control panel area 2A and housing 2, SO that the knurled edge of the disk-shaped thumbwheel switch 7 can be rotated by the trainer's thumb as the trainer's fingers grip the body of housing 2. Use of the detent switch ensures that each of the six stimulus signal amplitudes controlled by the thumbwheel switch 7 is precisely repeatable. It is important that the trainer be able to know that a certain position of thumbwheel switch 7 always produces the same amplitude of the resulting stimulus signal produced by the remote collar-mounted receiver/stimulus unit. Preferably, the front faces of thumbwheel switch 7 and push button switches 4, 5, and 6 are approximately flush with the surface of control panel area 2A. A light-emitting diode 8 indicates when rf data is being transmitted. Light emitting diode 8 also functions as an indicator or mark on the control panel surface area 2A with which the intensity setting marks on the face of the thumbwheel switch are aligned, so as to indicate the present intensity setting. Transmitter 1 is easily held in one hand by a trainer, as the length, width, and thicknesses of housing 2 are only 4.80 inches, 1.85 inches, and 1.25 inches, respectively. Also, The trainer usually holds the transmitter housing 2 so that thumbwheel switch 7 and all three switches 4, 5, 6 are all operated with his/her thumb, if the trainer is right-handed. Switches 4, 5, 6 are located along an arc so the same area of the trainer's thumb naturally contacts the three switches 4, 5, and 6.

In a first configuration, wherein transmitter 1 transmits signals 3A to only a single collar-mounted receiver 10 on a single dog, if the trainer to presses the lower push button switch 4, this causes the collar-mounted receiver to apply a continuous stimulus level through the electrodes to the skin of the dog's neck as long as pushbutton switch 4 is depressed (up to a maximum amount of time). The next switch, pushbutton switch 5, if depressed by the trainer, causes the remote collar-mounted receiver unit to apply a fixed, predetermined interval of stimulation, rather than a continuous level of stimulation, to the neck of the dog. The interval or duration of the stimulation applied in response to depressing of pushbutton switch 5 is independent of how long pushbutton switch 5 is depressed. In either case, the amplitude of the stimulation pulses applied by the electrodes to the neck of the dog is the amplitude selected by thumbwheel switch 7.

Pushbutton switch 6, if depressed by the trainer, causes the remote collar-mounted receiver unit to the emit an audible tone which is recognizable to the to the dog being trained.

Transmitter 1 can be reconfigured by a jumper connection so that each of pushbutton switches 4, 5, and 6, if depressed by the trainer, transmits a stimulus command to a different corresponding collar-mounted receiver unit mounted on the necks of one, two, or three dogs, respectively. The stimulation is applied continuously to the dog corresponding to the depressed pushbutton switch 4,5 or 6 for as long as the selected switch is depressed (up to a maximum amount of time). Preferably, the colors of pushbutton switches 4,5 and 6 are color-coded relative to the colors of the collars of corresponding receiver units mounted on the necks of the multiple dogs.

Figure 2:
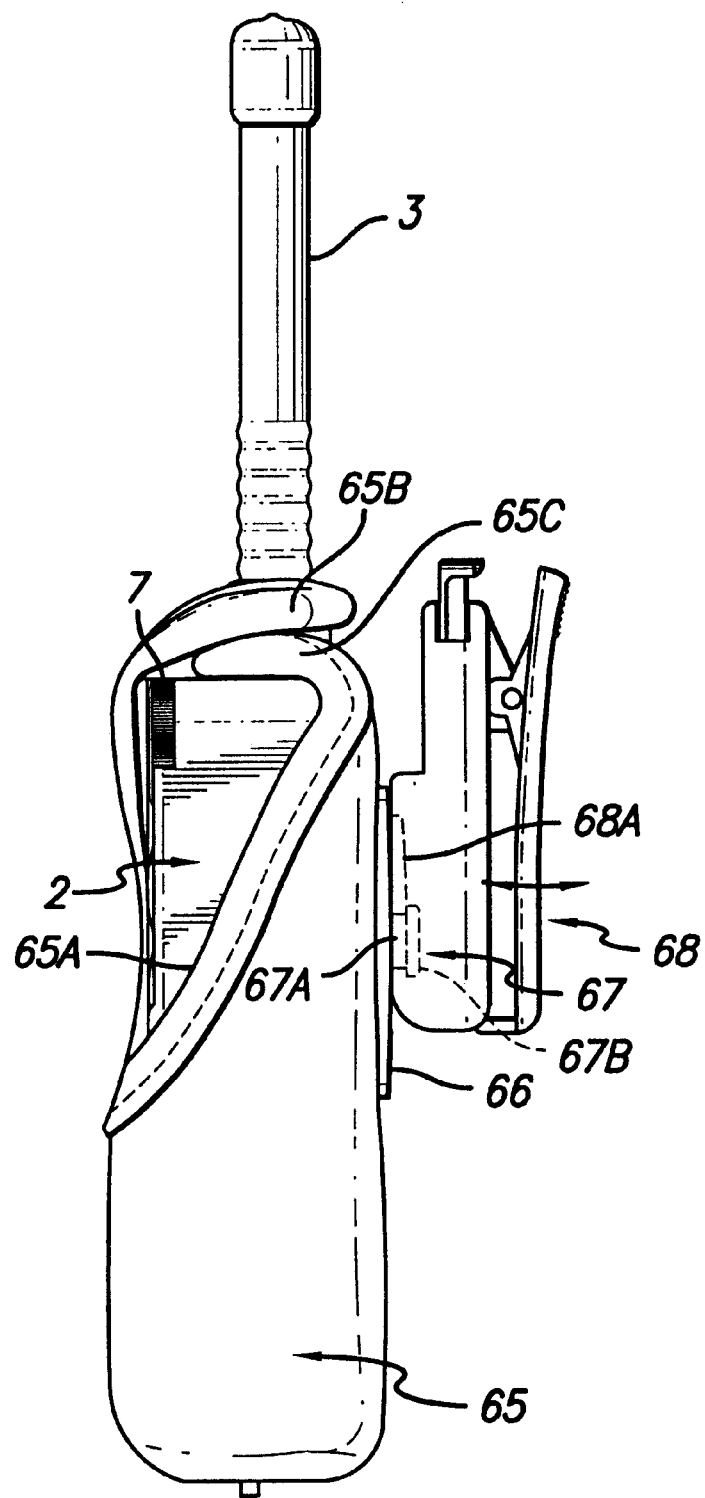
FIG. 2 is a perspective view illustrating the transmitter of FIG. 1 in a holster pivotally supported by a belt clip.

Referring to FIG. 2, a housing 2 of transmitter 1 is shown in a holster 65. Holster 65 includes a cutout 65A that allows the trainer to access to pushbutton switches 4, 5, and 6 and to thumbwheel switch 7. A top flap 65B of holster 65 has a Velcro connection on its bottom surface. A matching Velcro connection is provided on the top surface of a second flap 65C, to retain the body 2 of transmitter 1 within holster 65. Holster 65 is pivotally, removably mounted on a conventional belt clip 68 by means of a pivot pin 67 extending horizontally outward from a mounting plate 66 attached to the vertical rear surface of holster 65.

A trainer therefore can conveniently the press one or more of pushbutton switches 4, 5, and 6 and rotate intensity selection control thumbwheel switch 7 without necessarily removing transmitter 1 and holster 65 from belt clip 68.

The trainer also can pivot transmitter 1 and holster 65 about pivot pin 67 to orient antenna 3 in a preferred direction, if desired. The pivot pin 67 includes a shaft 67A and retaining head 67B which retains holster 65 securely in a slot 68A belt clip 68.

FIG. 3 shows a block diagram of the circuitry enclosed within housing 2. Referring to FIG. 3, the transmitter circuitry 11 in housing 2 of transmitter 1 includes a microcontroller 15, which can be a commercially available PIC16C621C microcontroller which includes a microprocessor, memory, and input/output interface circuitry. If the dog trainer selects one of the available six intensity level settings by means of thumbwheel switch 7, and then depresses one or more of pushbutton switches 4, 5 and 6, then controller 15 produces a serial digital data output stream representing a function code on conductor 16. If transmitter 1 is configured (by a suitable jumper connection) to communicate with multiple collar-mounted receivers on different dogs, the digital output stream also includes an address that must be recognized by the intended collar-mounted receiver before it can respond to the received function code. The function code, when received by the collar-mounted receiver unit actuates the selected stimulation level to be produced by the selected collar-mounted receiver. However, if transmitter 1 is configured for communication only with a single collar-mounted receiver, then the function code also determines whether continuous stimulation corresponding to depressing of pushbutton 4 or a predetermined duration of stimulation corresponding to depressing of pushbutton 5 is to be applied by the single collar-mounted receiver to the neck of the single dog. Furthermore, if transmitter 1 is configured for communication only with a single dog, the function code also determines whether the audible tone function of the receiver should be actuated, in accordance with whether or not pushbutton switch 6 has been depressed.

Still referring to FIG. 3, digital data on conductor 16 is provided as an input to a buffer circuit 17. Buffer circuit 17 produces an output signal on conductor 18 which is applied to the input of an FM modulator circuit 19, which has a center frequency of 27.045 MHZ, with a + or −8 kilohertz deviation. The output of FM modulator 19 is applied by conductor 20 to the input of an FM preamplifier 22. The output of preamplifier 22 is applied by conductor 23 to the input of a matching network 24. The output of matching network 24 is supplied by a conductor 25 to the input of a class C power amplifier 26, the output of which is applied by conductor 27 to the input of a single Pi matching network 28. The output of single Pi matching network 28 is applied by conductor 63 to antenna 3.

FIG. 4 illustrates the connections of controller 15 to the user input circuitry 13 including pushbutton switches 4,5,6 and thumbwheel switch 7. FIG. 4 also illustrates the connections of a regulated supply voltage $V_{DD}$ to the positive supply voltage terminal of controller 15 to light emitting diode 8, which appears on the control panel of transmitter 1 in FIG. 1. One terminal of each of pushbutton switches 4,5,6 is coupled by a resistor to a corresponding input of controller 15. Similarly, each of the six terminals of thumbwheel switch 7 is connected by a corresponding resistor to a corresponding input, respectively, of controller 15. Controller 15 "awakens" from a "sleep" condition and produces a signal PWRON on conductor 29 in response to sensing the depressing of any one of the pushbutton switches 4, 5 or 6. The signal PWRON then provides power to all of the rf stages and thereby enables transmitter unit 1 to operate.

Controller 15 operates to detect the state of each of the switch inputs by executing a polling routine and then producing a serial digital data output stream that includes function codes and address information to be transmitted to one or more collar-mounted receivers to enable them to generate the level of stimulation represented by the function code. Note that this technique replaces a prior technique in which a controller detects the switch inputs using a reset interrupt signal to reset the controller, causing it to read the states of the actuated switches. The improved polling routine technique avoids problems associated with driving the reset interrupt function of the controller from two different stimuli, specifically, the excessive amount of time required to execute interrupt subroutines. Use of the polling routine was found to allow use of simpler programming of microcontroller 15, use of simpler circuit design, and substantially faster response of the circuitry to depressing of one of the pushbutton switches 4, 5, or 6.

Figure 5:
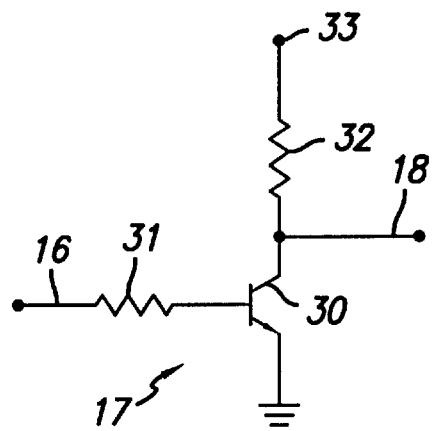
FIG. 5 is a schematic diagram of the buffer circuit 17 of FIG. 3.

Referring to FIG. 5, buffer 17 includes an NPN transistor 30 having its base coupled by resistor 31 and to the output 16 of controller 15. The emitter of transistor 30 is connected to ground, and its collector is connected by conductor 18 to one terminal of a resistor 32. The other terminal of resistor 32 is connected to conductor 33, on which a switched battery voltage is applied. Note that the simple buffer circuit shown in FIG. 5 replaces a much more complex prior multistage pulse shaper circuit including two operational amplifiers, 4 capacitors, and nine resistors.

Figure 6:
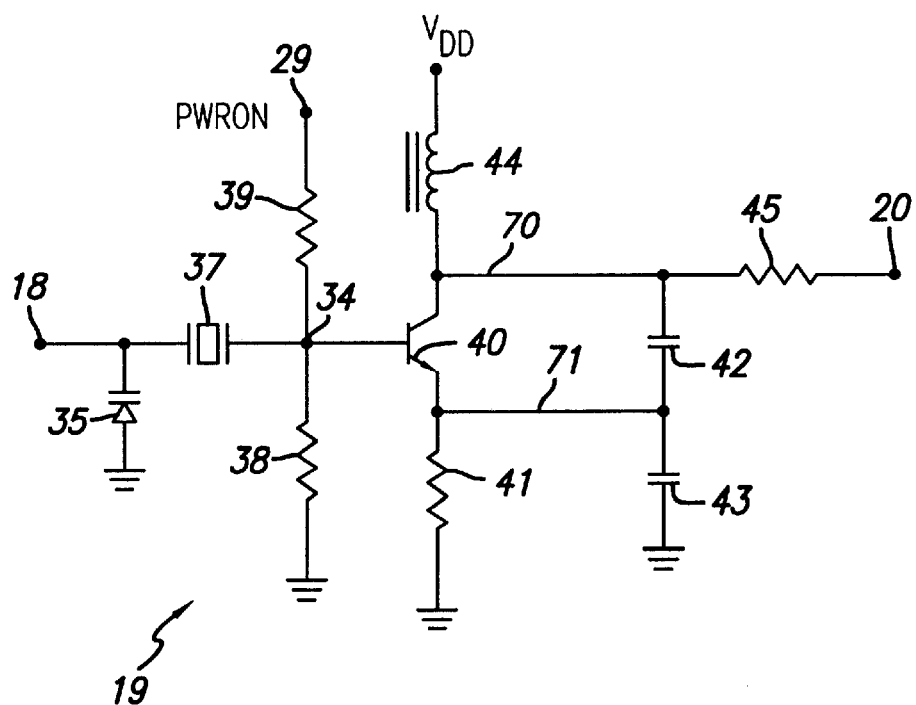
FIG. 6 is a schematic diagram of the FM modulator 19 of FIG. 3.

Referring to FIG. 6, FM modulator 19 includes an input connected by conductor 18 to the output of buffer 17. Conductor 18 is connected to the cathode of a varactor diode 35, which functions as a variable capacitor, having an anode connected to ground. Varying the voltage across varactor diode 35 allows FM modulation of the carrier signal. Conductor 18 also is connected one terminal of a crystal 37, the other terminal of which is connected by conductor 34 to the base of an NPN transistor 40 and also to the junction between a resistor 39 and a resistor 38. A resistor 38 is coupled to ground, and resistor 39 is coupled by conductor 29 to the PWRON signal produced by controller 15. The emitter of the transistor 40 is coupled by conductor 71 to one terminal of resistor 41 and to the junction between capacitors 42 and 43. The other terminal of resistor 41 is connected to ground. Conductor 71 is coupled by capacitor 43 to ground and is coupled by capacitor 42 to conductor 70. Conductor 70 is connected to one terminal of resistor 45, one terminal of inductor 44, and the collector of transistor 40. The other terminal of inductor 44 is connected to the regulated supply voltage $V_{DD}$. The other terminal of resistor 45 is connected to conductor 20.

Figure 7:
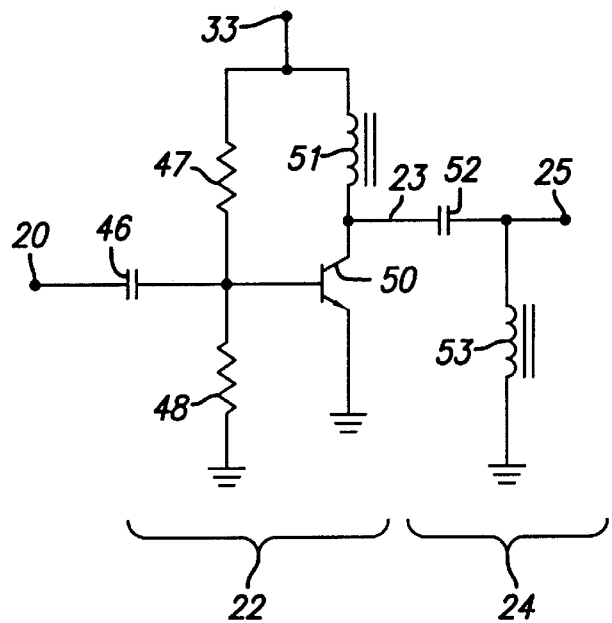
FIG. 7 is a schematic diagram of the pre-amplifier 22 and matching network 24 of FIG. 3.

FIG. 7 shows the circuitry for FM preamplifier 22 and matching network 24 of FIG. 3. FM preamplifier 22 includes a capacitor 46 having one terminal connected by conductor 20 to the output of FM modulator 19 and another terminal connected by conductor 49 to the junction between the resistors 47 and 48 and to the base of an NPN transistor 50. A second terminal of resistor 48 is connected to ground. A second terminal of resistor 47 is connected to conductor 33, on which the switched battery voltage is produced. The emitter of transistor 50 is connected to ground, and its collector is connected by conductor 23 to one terminal of inductor 51 and to one terminal of capacitor 52. The second terminal of inductor 51 is connected to switched battery voltage conductor 33. The second terminal of capacitor 52 is connected by conductor 25 to one terminal of inductor 53, the other terminal of which is connected to ground. Note that the use of capacitor 52 (which may have a value of 0.01 microfarads) as shown in matching network 24 replaced the use of a 4:1 stepdown transformer in a prior analogous circuit. Capacitor 52 requires far less space and is far less costly than the prior 4:1 stepdown transformer. Nevertheless, the use of capacitor 52 was found to accomplish the same benefit as the 4:1 stepdown transformer in transmitter 1.

Figure 8:
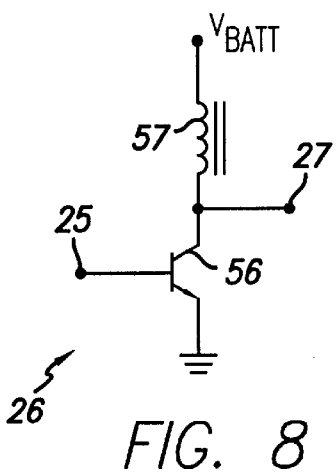
FIG. 8 is a schematic diagram of the class C power amplifier 26 of FIG. 3.

Referring to FIG. 8, conductor 25 also is connected to the input of a class C power amplifier 26. Conductor 25 is connected to the base of an NPN transistor 56 having its emitter connected to ground and its collector connected by conductor 27 to one terminal of inductor 57. The other terminal of inductor 57 is connected to the battery voltage $V_{BATT}$ produced by a conventional nine volt battery.

Figure 9:
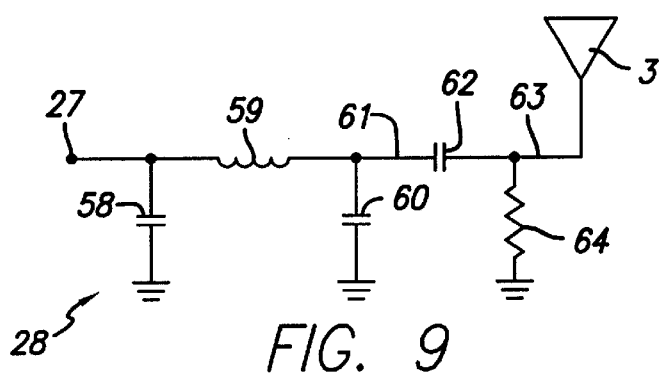
FIG. 9 is a schematic diagram of the matching network 28 of FIG. 3.

Referring to FIG. 9, single pi matching network 28 includes an input connected by conductor 27 to the output of class C power amplifier 26. The matching network 28 includes a capacitor 58 connected between conductor 27 and ground. An inductor 59 is connected between conductors 27 and 61. A capacitor 60 is connected between conductor 61 and ground. A capacitor 62 is connected between conductors 61 and 63. A resistor 64 is connected between conductor 63 and ground. Conductor 63 conducts the output of matching network 28 to antenna 3. Note that single pi matching network 28 provides a high-pass filtering characteristic which matches the high impedance of antenna 3. This is in contrast to a prior matching network which required use of a much larger, much more costly double pi network including three inductors, rather than one inductor, to match the high impedance of antenna 3 to the output of power amplifier 26. A 40 percent reduction in space required by matching network 28 is accomplished by the single pi circuit shown in FIG. 9.

Transmitter 1 can be configured as either a multi-dog, single-stimulus-function transmitter or as a single-dog, multi-stimulus-function transmitter simply by either providing or not providing a jumper 54 connected to an input of microcontroller 15. Such a jumper is shown as switch 54 in FIG. 4. Microcontroller 15 is programmed to read the state of the input to which the jumper 54 is connected or not connected and determines whether to operate in a single-dog, multi-stimulus-mode or a multi-dog, single-stimulus-mode.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

What is claimed is:

1. Transmitter circuitry for a portable dog-training transmitter unit including first, second, and third switches for controlling first, second, and third functions, respectively, represented by stimulus control signals to be transmitted, and a multiple-position detent switch for setting the amplitudes of the stimulus signals to be transmitted, the transmitter circuitry including:

i. a controller having a plurality of inputs coupled to the first, second, and third pushbutton switches and the thumbwheel detent switch, the controller including a first output conducting digital data representative of the states of the first, second, and third pushbutton switches and the thumbwheel detent switch;

ii. a buffer circuit having an input coupled to the first output of the controller for shaping pulses constituting the digital data;

iii. an FM modulator having an input coupled to an output of the buffer, for performing the function of modulating the carrier with the desired digital data;

iv. an FM preamplifier having an input coupled to an output of the FM modulator, for performing the function of buffering an oscillator and amplifying a signal produced by the FM modulator for use in a subsequent stage;

v. a matching network having an input coupled to an output of the FM preamplifier;

vi. a power amplifier having an input coupled to an output of the matching network; and vii. a single pi matching network having an input coupled to an output of the power amplifier and an output coupled to the antenna.

2. The transmitter circuitry of claim 1 wherein the controller includes a switch polling program, and executes the switch polling program in response to depressing of any of the first, second, and third pushbutton switches to determine the states of the first, second, and third pushbutton switches and the thumbwheel detent switch.

3. The transmitter circuitry of claim 2 wherein the buffer circuit includes a first transistor having a first electrode coupled to a first reference voltage conductor, a second electrode coupled to an output of the buffer circuit and to one terminal of a load device, and a control electrode coupled by a resistor to the first output of the controller.

4. The transmitter circuitry of claim 1 wherein the matching network includes a capacitor coupled between an output of the FM preamplifier and an input of the power amplifier.

5. The transmitter circuitry of claim 4 wherein the matching network also includes an inductor coupled between the output of the matching network and the first reference voltage conductor.

6. The transmitter circuitry of claim 1 wherein the single pi matching network includes a first capacitor coupled between the output of the power amplifier and the first reference voltage conductor, an inductor coupled between the output of the power amplifier and a first node, a second capacitor coupled between the first node and the first reference voltage conductor, a third capacitor coupled between the first node and the output of the single pi matching network, and the resistor coupled between the output of the single pi matching network and the first reference voltage conductor.

7. The transmitter circuitry of claim 1 wherein the controller is configured to cause the first and second pushbutton switches, when depressed, to produce different corresponding stimulus intensity levels to be produced by the collar-mounted receiver stimulus unit.

8. The transmitter circuitry of claim 7 wherein the first pushbutton switch, when depressed, causes a continuous stimulus intensity level of amplitude determined by the setting of the thumbwheel detent switch to be produced by the collar-mounted receiver/stimulus unit for as long as the first pushbutton switch remains depressed, up to a predetermined maximum duration.

9. The transmitter circuitry of claim 8 wherein the second pushbutton switch, when depressed, causes a predetermined stimulus intensity level of a predetermined duration to be produced by the collar-mounted receiver/stimulus unit.

10. The transmitter circuitry of claim 9 wherein the third pushbutton, when depressed, causes the collar-mounted receiver/stimulus unit to produce an audible sound.

11. The transmitter circuitry of claim 1 wherein the controller is configured to cause the transmitter unit to transmit different first, second, and third address codes recognizable by first, second, and third remote collar-mounted receiver/stimulus units, respectively, in response to depressing of the first, second, and third pushbutton switches, respectively.

12. The transmitter circuitry of claim 11 wherein the transmitter unit, in response to depressing of one of the first, second, and third pushbutton switches, causes a continuous stimulus intensity level of amplitude determined by the setting of the thumbwheel detent switch to be produced by the one of the first, second, and third remote collar-mounted receiver/stimulus units corresponding to the depressed one of the first, second, or third pushbutton switches for as long as that one of the first, second, and third pushbutton switches remains depressed, up to a predetermined maximum duration.

13. A portable dog-training transmitter unit for transmitting stimulus control signals to a remote collar-mounted receiver/stimulus unit on a dog, comprising:

(a) a rectangular housing having opposed the front and rear surfaces, opposed right side and left side surfaces, and opposed top and bottom surfaces;

(b) an antenna extending upward from the top surface;

(c) a control panel area on the upper right portion of the front surface;

(d) first, second, and third pushbutton switches disposed in the control panel area connected to control first, second, and third functions, respectively, represented by stimulus control signals transmitted by the transmitter unit;

(e) a multiple-position thumbwheel detent switch disposed in an upper right corner portion of the control panel area for setting the amplitudes of stimulus signals produced by the collar-mounted receiver/stimulus unit.

14. The portable dog-training transmitter unit of claim 13 wherein the first, second, and third pushbutton switches and the thumbwheel detent switch have surfaces which are approximately flush with the surface of the control panel area.

15. The portable dog-training transmitter unit of claim 14 wherein the thumbwheel detent switch is disposed in a recess in an upper right portion of the control panel area.

16. The portable dog-training transmitter unit of claim 13 wherein the thumbwheel detent switch includes six repeatable positions reliably and repeatably determining six selectable amplitude settings of stimulus signals produced by the collar-mounted receiver/stimulus unit.

17. The portable dog-training transmitter unit of claim 13 wherein the height of the housing is approximately 4.80 inches, the width of the housing is approximately 1.85 inches, and the thickness of the housing is approximately 1.25 inches.

18. The portable dog-training transmitter unit of claim 17 wherein the antenna has a length of approximately 3.0 inches.

19. The portable dog-training transmitter unit of claim 13 wherein the housing includes transmitter circuitry including i. a controller having a plurality of inputs coupled to the first, second, and third pushbutton switches and the thumbwheel detent switch the controller including a first output conducting digital data representative of the states of the first, second, and third pushbutton switches in the thumbwheel detent switch;

ii. a buffer circuit having an input coupled to the first output of the controller for shaping pulses constituting the digital data;

iii. an FM modulator having an input coupled to an output of the buffer, for performing the function of modulating the carrier with the desired digital data;

iv. an FM preamplifier having an input coupled to an output of the FM modulator, for performing the function of the buffering an oscillator and amplifying a signal produced by the FM modulator for use in a subsequent stage;

v. a matching network having an input coupled to an output of the FM preamplifier;

vi. a power amplifier having an input coupled to an output of the matching network; and vii. a single pi matching network having an input coupled to an output of the power amplifier and an output coupled to the antenna.

20. The portable dog-training transmitter unit of claim 19 wherein the controller includes a switch polling program, and executes the switch polling program in response to depressing of any of the first, second, and third pushbutton switches to determine the states of the first, second, and third pushbutton switches and the thumbwheel detent switch.

21. The portable dog-training transmitter unit of claim 19 wherein the buffer circuit includes a first transistor having a first electrode coupled to a first reference voltage conductor, a second electrode coupled to an output of the buffer circuit and to one terminal of a load device, and the control electrode coupled by a resistor to the first output of the controller.

22. The portable dog-training transmitter unit of claim 19 wherein the matching network includes a capacitor coupled between an output of the FM preamplifier and the output of the FM preamplifier.

23. The portable dog-training transmitter unit of claim 22 wherein the matching network also includes an inductor coupled between the output of the matching network and the first reference voltage conductor.

24. The portable dog-training transmitter unit of claim 19 wherein the single pi matching network includes a first capacitor coupled between the output of the power amplifier and the first reference voltage conductor, an inductor coupled between the output of the power amplifier and a first node, a second capacitor coupled between the first node and the first reference voltage conductor, a third capacitor coupled between the first node and the output of the single pi matching network, and the resistor coupled between the output of the single pi matching network and the first reference voltage conductor.

25. The portable dog-training transmitter unit of claim 13 wherein the controller is configured to cause the first and second pushbutton switches, when depressed, to produce different corresponding stimulus intensity levels to be produced by the collar-mounted receiver stimulus unit.

26. The portable dog-training transmitter unit of claim 25 wherein the first pushbutton switch, when depressed, causes a continuous a stimulus intensity level of amplitude determined by the setting of the thumbwheel detent switch to be produced by the collar-mounted receiver/stimulus unit for as long as the first pushbutton switch remains depressed, up to a predetermined maximum duration.

27. The portable dog-training transmitter unit of claim 26 wherein the second pushbutton switch, when depressed, causes a predetermined stimulus intensity level of a predetermined duration to be produced by the collar-mounted receiver/stimulus unit.

28. The portable dog-training transmitter unit of claim 27 wherein the third pushbutton switch, when depressed, causes the collar-mounted receiver/stimulus unit to produce an audible sound.

29. The portable dog-training transmitter unit of claim 19 wherein the controller is configured to cause the transmitter unit to transmit different first, second, and third address codes recognizable by first, second, and third remote collar-mounted receiver/stimulus units, respectively, in response to depressing of the first, second, and third pushbutton switches, respectively.

30. The portable dog-training transmitter unit of claim 29 wherein the transmitter unit, in response to depressing of one of the first, second, and third pushbutton switches, causes a continuous stimulus intensity level of amplitude determined by the setting of the thumbwheel detent switch to be produced by the one of the first, second, and third remote collar-mounted receiver/stimulus units corresponding to the depressed one of the first, second, or third pushbutton switches for as long as that one of the first, second, and third pushbutton switches remains depressed, up to a predetermined maximum duration.

31. The portable dog-training transmitter unit of claim 13 including a holster in which the housing is removably supported, a pivot pin rigidly attached to a rear surface of the holster, and a belt clip in which the pivot pin is pivotally retained.

32. The portable dog-training transmitter unit of claim 13 including a holster in which the housing is removably supported, a pivot pin rigidly attached to a rear surface of the holster, and a clip in which the pivot pin is pivotally retained.

\* \* \* \* \*